US006660161B2

(12) United States Patent
Danielsson et al.

(10) Patent No.: US 6,660,161 B2
(45) Date of Patent: Dec. 9, 2003

(54) DEWATERING DEVICE

(75) Inventors: Magnus Danielsson, Matfors (SE); Jörgen T Lundberg, Sundsvall (SE)

(73) Assignee: Metso Paper, Inc. (FI)

( * ) Notice: Subject to any disclaimer, the term of this patent is extended or adjusted under 35 U.S.C. 154(b) by 7 days.

(21) Appl. No.: 10/275,413

(22) PCT Filed: May 4, 2001

(86) PCT No.: PCT/SE01/00965

§ 371 (c)(1),
(2), (4) Date: Nov. 4, 2002

(87) PCT Pub. No.: WO01/86060

PCT Pub. Date: Nov. 15, 2001

(65) Prior Publication Data

US 2003/0080044 A1 May 1, 2003

(30) Foreign Application Priority Data

May 5, 2000 (SE) .............................................. 0001695

(51) Int. Cl.[7] ......................... B01D 33/06; B01D 33/37; D21C 9/18; D21C 9/06; B30B 9/20

(52) U.S. Cl. ........................ 210/326; 210/402; 100/121

(58) Field of Search ................................ 210/326, 402; 100/121

(56) References Cited

U.S. PATENT DOCUMENTS

| | | | | |
|---|---|---|---|---|
| 4,782,747 | A | * | 11/1988 | Unger et al. |
| 5,667,642 | A | * | 9/1997 | Luthi |
| 5,902,456 | A | * | 5/1999 | Sundqvist et al. |
| 6,311,849 | B1 | * | 11/2001 | Sbaschnigg et al. |
| 6,461,505 | B1 | * | 10/2002 | Danielsson et al. |

FOREIGN PATENT DOCUMENTS

| | | |
|---|---|---|
| WO | WO-96/18495 A1 | 6/1996 |
| WO | WO-00/28134 A1 | 5/2000 |

* cited by examiner

*Primary Examiner*—Thomas M. Lithgow
(74) *Attorney, Agent, or Firm*—Lerner, David, Littenberg, Krumholz & Mentlik, LLP

(57) ABSTRACT

Apparatus for pressing liquid from a liquid containing material is disclosed including a pair of juxtaposed rotary rolls forming a nip, at least one of the rolls being liquid permeable, that roll including an abduction surface extending laterally across the roll so that a portion of the liquid stream pressed out form the liquid containing material passing through the nip runs along the abduction surface, a liquid collector for collecting that portion of pressed out liquid extending laterally across the roll and including a liquid inlet for the pressed out liquid stream, and a return flow protector for preventing the pressed out liquid stream from rewetting the reduced liquid material formed in the nip.

7 Claims, 4 Drawing Sheets

DEWATERING DEVICE

FIELD OF THE INVENTION

The present invention relates to a device for dewatering material suspensions. The device comprises two co-operating cylindrical rotary rolls, where at least one of the rolls is liquid permeable. The rolls form a nip between them, through which the material is intended to pass downward from above while simultaneously being dewatered.

The material suspension can be, for example, a pulp suspension, and the dewatering device can then be a washing press or a dewatering press.

BACKGROUND OF THE INVENTION

In the following description a dewatering device according to known art will be described, where both rolls are liquid permeable. The rolls are formed with liquid permeable shell surfaces, which consist of a perforated metal sheet attached to a roll body. In order to gain high capacity, the total open hole area should be great, and at the same time the holes must be small to prevent fine material, for example small fibers, from following along with the liquid through the holes. For solving these problems, the rolls can be provided with a wire cloth on the outside of the perforated shell sheet. The wire cloth allows liquid flow also along the shell surface, and is usually formed of plastic wires. This implies that the perforations can be given a greater size in order to yield a higher capacity without the risk of an increase in the passage of fine material. The wire cloth is used above all when the pulp suspension to be treated contains much fine material, which is the case, for example, with mechanically produced pulps.

The rolls are mounted so as to be rotary on two parallel shafts. The material suspension is supplied to the device, so that it is moved by the rotation of the rolls downward from above through the nip, whereby compression and dewatering of the material to a desired dry matter content takes place.

After the nip, the pick-up of the material from the rolls takes place with the help of a doctor means and the force of gravity. The material drops down into a transport means and is conveyed away from the dewatering device.

Against the shell surface of each roll a doctor blade abuts, which extends along the entire length of the roll. The roll can have a length of up to about 8 m. The object of the doctor blade is to ensure the pick-up of the material from the rolls and to scrape it off mechanically. In the case of rolls with wire cloth, the doctor blades must be arranged at a small distance, usually 0.1 to 0.5 mm, from the roll in order to prevent the doctor blades from cutting the wire cloth to pieces.

A dewatering device of this kind is described, for example, in Swedish Patent No. 504,011.

In the case when only one of the rolls is liquid permeable, it is formed as described above and consequently has a doctor means for picking up the material. The liquid impermeable roll in this case is provided substantially to make the formation of a nip possible.

In a dewatering device of this kind problems arise with the re-wetting of the dewatered material. When the dewatered material leaves the nip, the compressing force decreases. Pressed-off liquid (filtrate) can then run back through the perforated sheet and re-wet the material, which deteriorates the washing result and dry matter content.

In a dewatering device of this kind problems also arise due to the wear of the doctor blades and deflection of same. The doctor means is subject to stringent requirements, whereby the doctor blades should abut the roll, but the force between the blade and the roll must not be so great that the blade and roll are subjected to great mechanical stress. In spite of accurately designed and rigid doctor means, problems arise with wear of the doctor blades and rolls. The doctor blades must be exchanged often because of wear. They are expensive with regard to both their design and manufacture. Wear of the rolls also causes deterioration of their operation and shortening of their life.

When a roll is covered with a wire, an interspace of tenths of a millimeter must be maintained between the doctor blade and the wire. One wants the doctor blade to be located as close to the wire as possible, but without cutting the wire to pieces. This is not made easier by the fact that the doctor blades get worn, and the wire is thus cut to pieces by the doctor blades.

The present invention offers a solution to the aforesaid problems. The functioning of the invention presupposes that the material suspension to be dewatered after the nip has such a dry matter content, that it gets free from the roll, which is facilitated if the dewatered material forms a coherent material web after the nip.

Experiments have shown that the filtrate, which runs back after the nip, preferably places itself like a film of liquid on the roll. This liquid film then follows along with the roll during its rotation. The doctor blade, which according to known art abuts the roll, scrapes off this film, so that it follows along with the dewatered material and re-wets the same. The liquid runs along the doctor blade and down into the transport meets where it re-wets the material.

SUMMARY OF THE INVENTION

In accordance with the present invention, these and other objects have now been realized by the invention of apparatus for pressing liquid from a liquid-containing material comprising a pair of juxtaposed rotary rolls forming a nip therebetween, at least one of the pair of juxtaposed rotary rolls being liquid permeable, whereby the liquid-containing material can pass downwardly toward the nip between the pair of juxtaposed rotary rolls for pressing the liquid from the liquid-containing material thereby providing a pressed-out liquid stream and a liquid reduced material, the at least one of the pair of juxtaposed rotary rolls including an abduction surface extending laterally across the at least one of the pair of juxtaposed rotary rolls whereby at least a portion of the pressed out liquid stream runs along the abduction surface, liquid collection means for collecting the portion of the pressed-out liquid stream extending laterally across the at least one of the pair of juxtaposed rotary rolls, the liquid collection means including a liquid inlet for the pressed-out liquid stream, and return flow protection means for preventing the pressed-out liquid stream from rewetting the reduced liquid material. In a preferred embodiment, the abduction surface includes an upper end portion including at least one doctor blade for scraping the pressed-out liquid stream from the surface of the at least one rotary roll between the nip and a predetermined location on the roll where the pressed-out liquid stream is released from the roll.

In accordance with one embodiment of the apparatus of the present invention, the abduction surface includes an upper end portion comprising at least one screen member including an upper end adjacent to the roll and displaced a predetermined distance from the roll whereby a film of the pressed-out liquid disposed on the at least one of the pair of juxtaposed rotary rolls below the nip can pass between the upper end of the screen member and the at least one of the pair of juxtaposed rotary rolls before being released from the at least one of the pair of juxtaposed rotary rolls and the reduced liquid material passes on the side of the screen member distal from the at least one of the pair of juxtaposed rotary rolls. In a preferred embodiment, the predetermined distance is at least about 2 mm.

In accordance with one embodiment of the apparatus of the present invention, both of the pair of juxtaposed rotary rolls are liquid permeable.

In accordance with another embodiment of the apparatus of the present invention, the liquid inlet comprises a gap formed laterally along the entire length of the at least one of the pair of juxtaposed rotary rolls.

In accordance with another embodiment of the apparatus of the present invention, the liquid inlet comprises a plurality of substantially horizontal longitudinally extending rods forming a corresponding plurality of narrow gaps therebetween.

In accordance with the present invention, and in order to prevent the liquid running along the doctor blade from re-wetting the material, a liquid abduction means, or a gill, is provided. The liquid running along the doctor blade is thus led into the gill instead of being allowed to run down into the transport means. The re-wetting is thereby reduced considerably.

When great amounts of liquid are scraped off the rolls, it may happen that part of the liquid is released from the doctor blade before the liquid has been led into the gill. According to the present invention, the doctor blade can then be replaced by a screen means. The screen means is arranged so that the distance between the screen means and the roll is so great, that the filtrate liquid film on the roll passes between the screen means and the roll and thereafter, without coming into contact with the dewatered material, runs down into filtrate collection means. The function of the gill in this case is to catch liquid which, for example at an occasionally thicker filtrate liquid, film, does not pass between the screen means and the roll, but runs along the screen means on its side facing the material web. Due to the fact that the doctor blade in this case is removed, the mechanical effect between the roll and the doctor blade is eliminated, and thereby also all costs in connection with exchange of worn doctor blades are eliminated. There is also no risk that the wire cloth or roll can be damaged.

The requirement on accuracy during the forming of the screen means and on its rigidity are much lower than with a doctor means, because the screen means is located at a relatively great distance from the roll. The present invention, therefore, results in a reduction of costs related to design and manufacture compared to the use of doctor means.

With a device according to the present invention the dry matter content of pulp can be increased from about 2.5 to 8%, to up to about 20 to 40%, preferably from about 3 to 8%, up to about 30 to 40%.

BRIEF DESCRIPTION OF THE DRAWINGS

The present invention is described in greater detail in the following detailed description, with reference to the accompanying drawings, in which.

DETAILED DESCRIPTION

Figure 1:
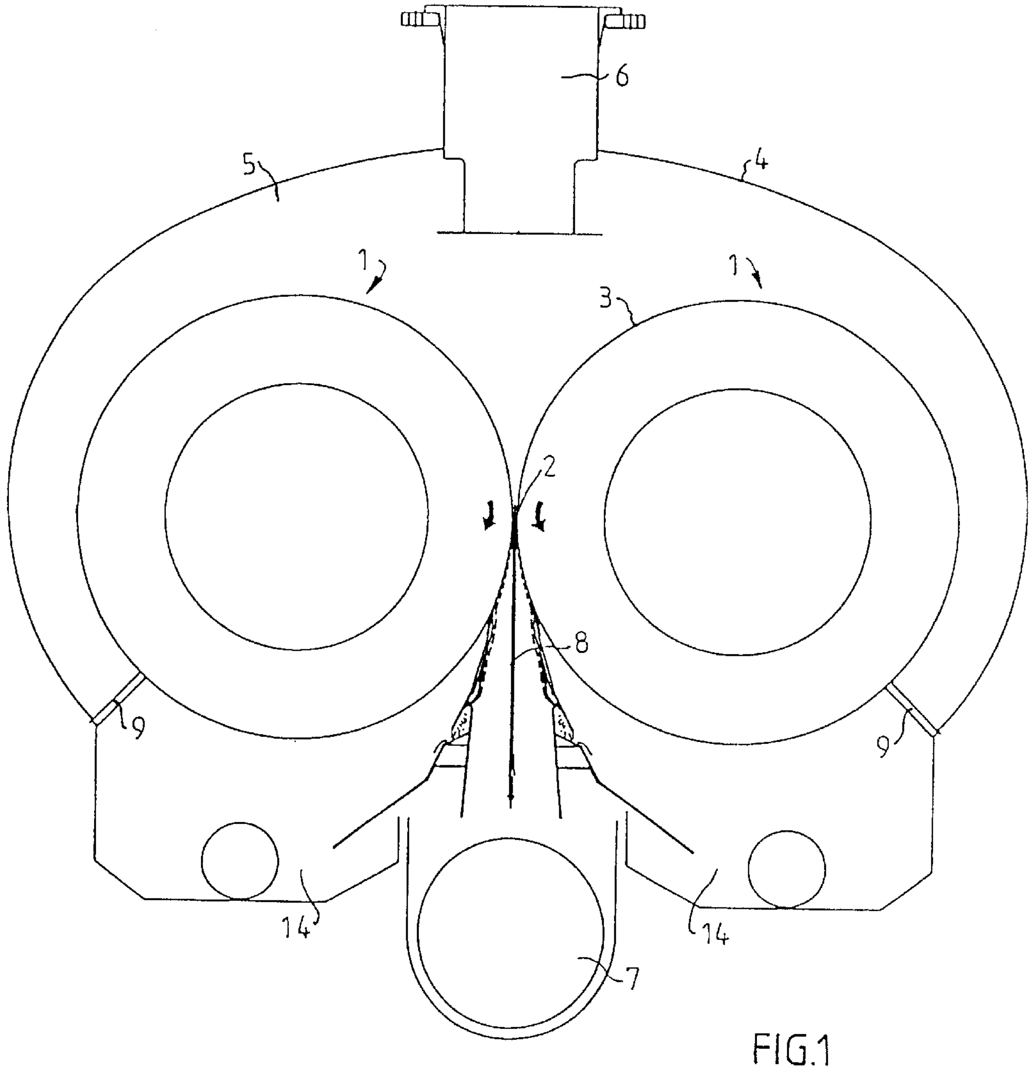
FIG. 1 is a side, elevational, cross-sectional view of a dewatering means according to the present invention.

The dewatering device shown in FIG. 1 comprises two co-operating cylindrical rotary liquid permeable press rolls 1, which between them form a press nip 2. For controlling the size of the nip 2, at least one of the rolls 1 is adjustable. The shell surface of the rolls 1 consists of a liquid permeable shell 3, suitably a perforated metal sheet with or without a wire cloth, which is attached to a roll body. The upper portion of the rolls 1 is enclosed in a casing 4 so that a space 5 is formed above the rolls 1. To the casing 4 at least one inlet 6 for the supply of material suspension is connected. In the space 5 a higher pressure is maintained than in and below the rolls 1. The pressure is suitably established by a pump which feeds the material suspension to the space 5.

Due to the overpressure in the space 5, liquid from the material suspension is pressed into the roll 1. The liquid is pressed through the liquid permeable shell surface 3, and at the same time the material is deposited on the surface of the shell surface 3. The material is then moved by the rotation of the rolls 1 through the nip 2 where it is dewatered to a dry matter content, which depends, for example, on the properties of the material and on the force applied to the pulp web. After the nip 2 the pick-up of the dewatered material from rolls takes place with the help of the force of gravity. The material should thereby have a dry matter content such that it is released from the rolls 1. This is facilitated if the material after the nip 2 forms a coherent material web 8. The weight of the material web 8 contributes to draw with itself subsequent material web 8. In the case where the material suspension is a pulp suspension, the dry matter content after the nip should be above about 20%, but preferably above about 30%, so that the material shall form a coherent material web 8.

After the nip 2 the material drops down into a transport means 7, for example a tearscrew.

In order to be subjected to an overpressure, the space 5 is sealed from the ambient by seals 9 against the shell surfaces of the rolls 1 and seals (not shown), which are applied to the end walls of the rolls. Between the rolls 1 the material web 8 in the nip 2 acts as a seal.

Part of the liquid (filtrate) pressed out of the material suspension and in through the liquid permeable shell surface 3 of the roll 1 runs back after the nip 2 and forms a liquid film 10 of filtrate on the roll 1. The liquid film participates in the rotation of the roll 1. A doctor blade 16, which extends along the entire length of the roll, scrapes the liquid film off the roll 1. The liquid runs along an abduction surface 20 into a gill 17. The abduction surface 20 and gill 17 extend along the entire length of the roll 1. In the embodiment shown, the upper portion of the abduction surface 20 consists of the doctor blade 16.

The doctor blade 16 can be composed of several doctor blades, which together extend along the entire length of the roll.

The gill 17 has a liquid inlet 18, in this case a gap, which extends along the entire length of the roll 1. The gill 17 is formed with a return flow protection 19, in this case a longitudinal wall, so that the liquid, which has run in through the liquid inlet 18, cannot run back and re-wet the material. The liquid is led from the gill 17 to a filtrate collection means 14.

The abduction surface 20 should be formed so that the liquid does not get released and drops down into the transport means 7. The abduction surface 20, thus, should have a relatively plane surface and should not incline too much.

Figure 3:
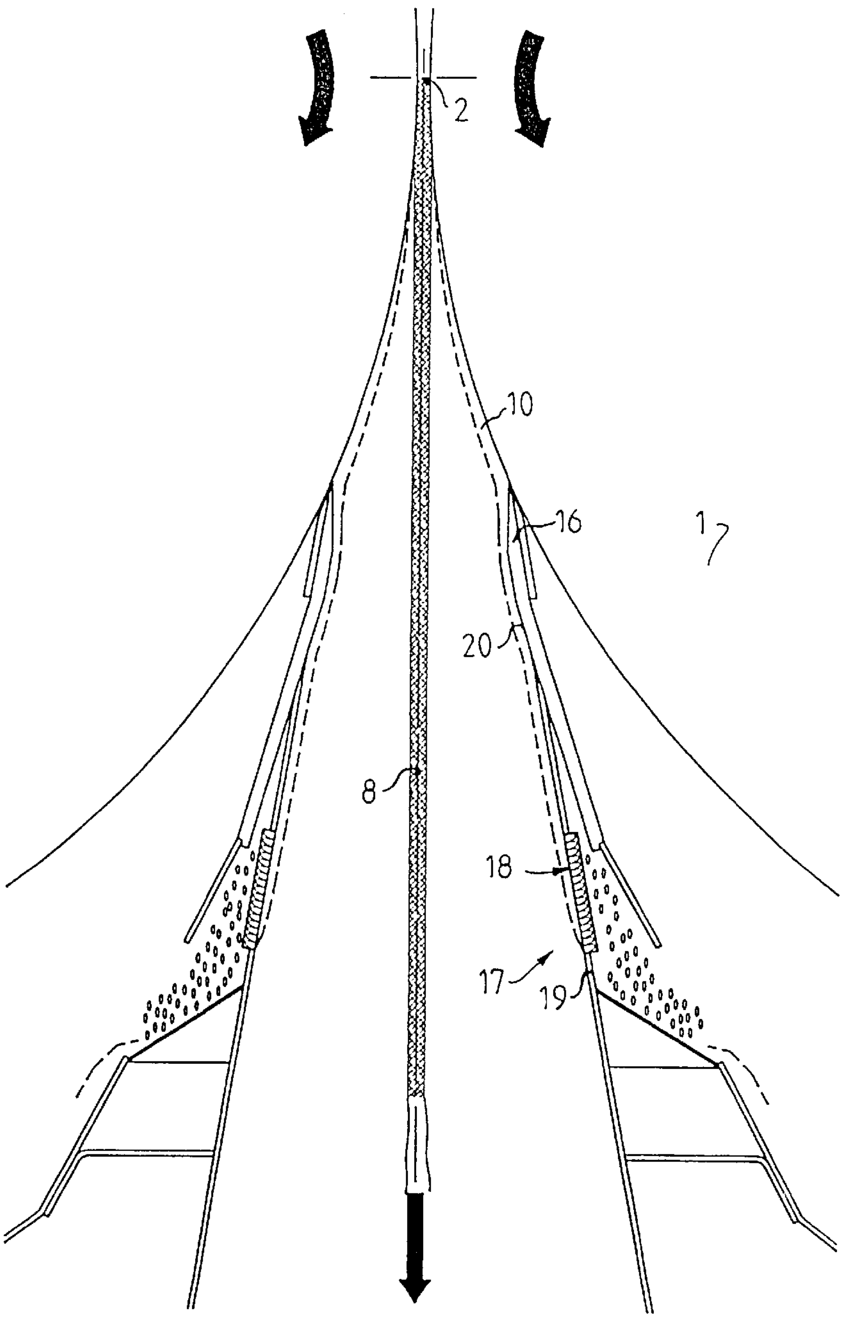
FIG. 3 is a side, elevational, partial enlarged view of another embodiment of the dewatering device according to the present invention.

The gill 17 can also, for example as in FIG. 3, be formed with a rod screen plate as liquid inlet 18, i.e. with a plurality of longitudinal rods 21, which between them form narrow gaps. In FIG. 3 the rods are substantially horizontal, but can also be oblique.

A plurality of gills can also be arranged for collecting the liquid. An abduction surface should then be provided to lead the liquid into the respective gill.

As stated before, the filtrate liquid film 10 participates in the rotation of the roll 1. The liquid film, however, is finally released from the roll 1 and drops down. The doctor blades 16, thus, should be located sufficiently close to the nip 2 such that the filtrate liquid film cannot by itself can be released from the roll 1 and drop down into the transport means 7 and thereby re-wet the material.

Figure 4:
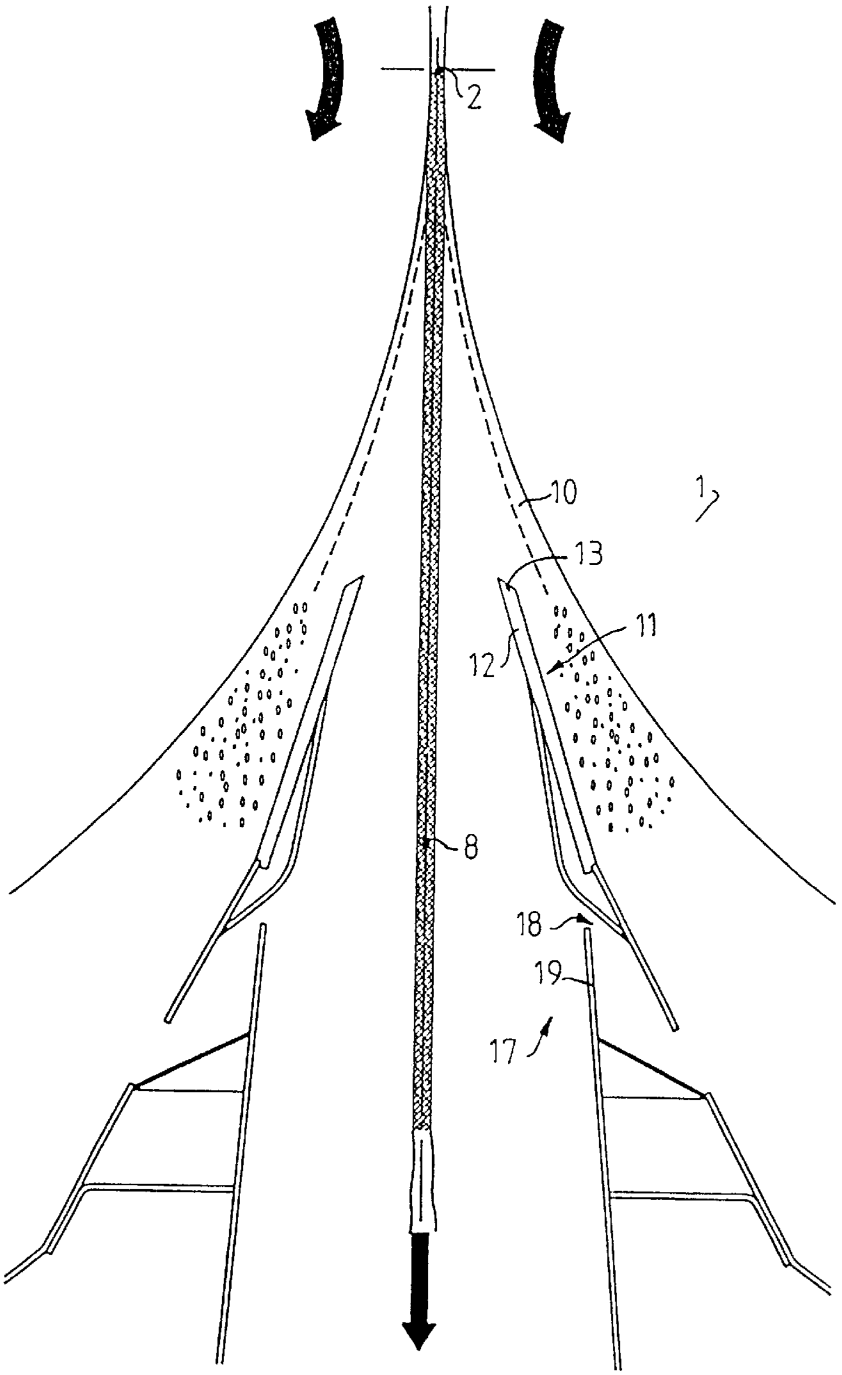
FIG. 4 is a side, elevational, partial enlarged view of another embodiment of the dewatering device according to the present invention, including a screen means.

The doctor blades 16 can be replaced by screen means 11, as shown in FIG. 4. For each roll 1 at least one screen means is provided below the nip 2. Every screen means comprises a screen 12, which extends along the entire length of the roll 1, its uppermost portion 13 being located closest to the roll 1. The screen means 11 can comprise several screens 12, which are arranged so that together they extend along the entire length of the roll. Every screen means 11 and its screen 12 is adjustable to adjust its portion in relation to the roll 1.

The screen 12 is positioned so that its uppermost portion 13 is at such a distance from the roll 1, that the filtrate liquid 10 passes between the roll 1 and screen substantially without the uppermost portion 13 of the screen coming into contact with the filtrate liquid film 10. The dewatered material/material web 8 passes on the opposite side of the uppermost portion 13 of the screen as the filtrate liquid film 10, as shown in FIG. 4.

The screen 1 should be located in a place so that the filtrate liquid film passes in between the uppermost portion 13 of the screen and the roll 1, before the filtrate liquid film 10 is released from the roll 1. The filtrate is thereafter led down into a filtrate collection means 14 without coming into contact with the dewatered material. This is done suitably with the help of the screen means 11, for example, as shown in FIG. 4, in that the screen 12 extends a distance down into the filtrate collection means 14.

The screens 12 shall also be formed and arranged so that the filtrate passing between the roll 1 and its screen 12 is not stopped up. The distance B between the roll 1 and its screen 12 should suitably increase with the distance from the nip 2.

Figure 2:
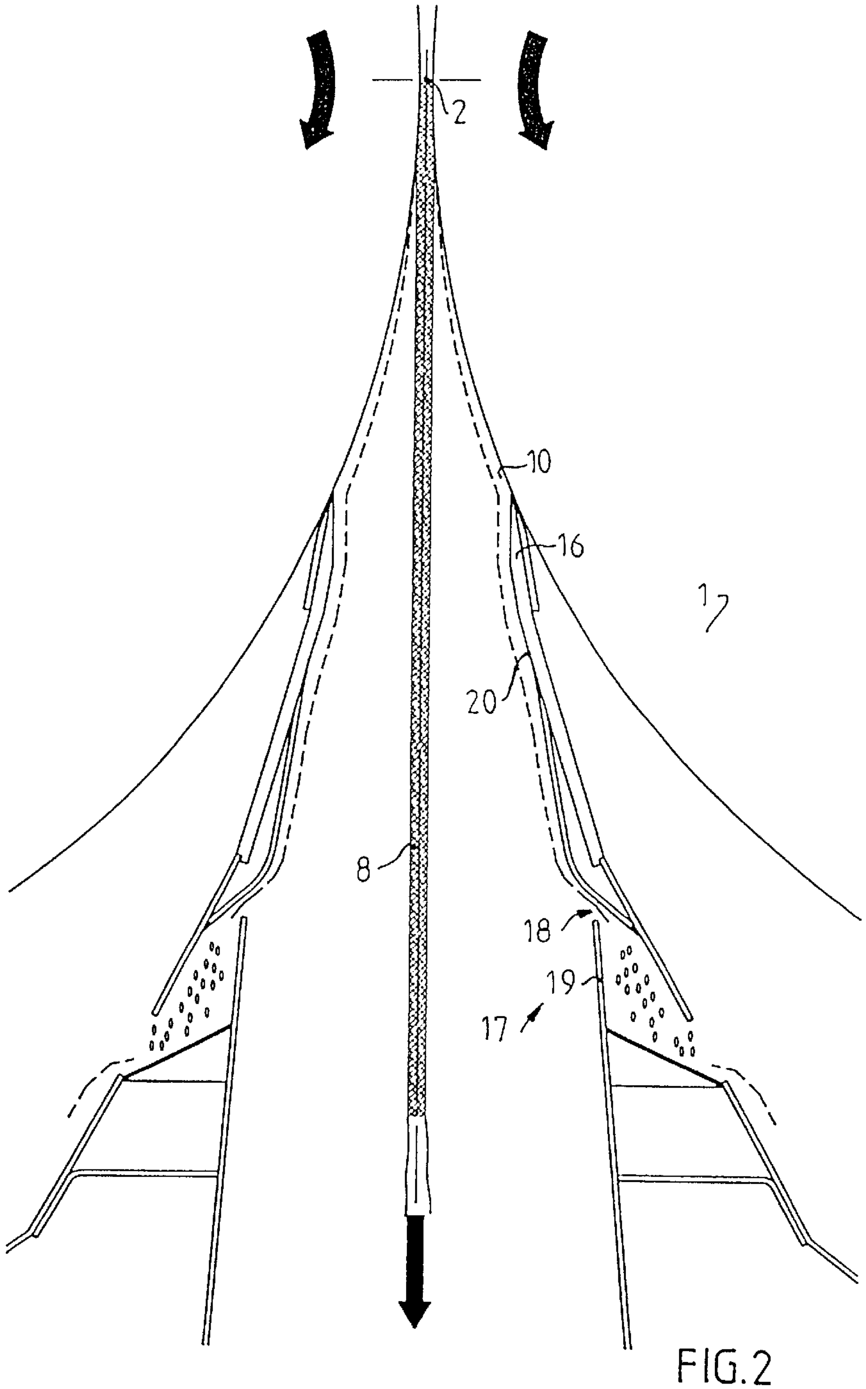
FIG. 2 is a side, elevational, partial enlarged view of the dewatering device in FIG. 1.

If the uppermost portion 13 of the screen comes into contact with the filtrate liquid film 10 on the roll 1, the filtrate liquid film 10 at least partially can be released from the roll 1 and then pass on the same side of the screen 12 as the dewatered material. This liquid runs in this case along the abduction surface 20 and into the gill 17, in the same way as described with reference to FIGS. 1, 2 and 3.

If it is desired that all the liquid or in any case the major part of the liquid shall pass between the roll 1 and screen means 11, it must be considered that the filtrate liquid film 10 is thinnest closest to the nip 2 and then increases in thickness farther away therefrom.

This implies that the farther up to the nip the screen 12 is located, the closer to the roll the screen 12 can be placed. The material web 8 can also deviate somewhat to the screen 12. In order to prevent the material web from moving in between the roll 1 and its screen 12, in this case the uppermost portion 13 of the screen should be located as close as possible to the roll 1, with regard to the thickness of the filtrate liquid film 10. Furthermore, during the start-up of a dewatering device according to the present invention the dry matter content of the material after the nip 2 can be so low that the material is not released from the roll 1, and that a material web 8 is not immediately formed. The material can then due to the rotation of the rolls 1 be thrown in different directions and even follow along with the rolls in their rotation. If it is desired to minimize the amount of material which during start-up passes between the screen 12 and roll 1, also from this point of view the uppermost portion 13 of the screen must be positioned as close as possible to the roll 1, with regard to the thickness of the filtrate liquid film 10. The position of the screens 12 in relation to the rolls 1 and nip 2 will be an optimizing of the distance between the screens 12, with regard, for example, to the place where the filtrate liquid film 10 is released from the roil 1, the thickness of the filtrate film 10 and the way in which the material behaves after the nip 2.

The distance between the roll 1 and the uppermost portion 13 of its screen should be at least about 2 mm, but suitably at least about 3 mm, and preferably at least about 5 mm.

If it is desired to avoid to the greatest possible extent that filtrate liquid runs on the same side of the screen 12 as the material passes, the distance between the roll 1 and the uppermost portion 13 of its screen should be more than about 20 mm, but suitably more than about 30 mm.

The uppermost portion 13 of the screen is suitably formed so that it prevents possibly deposited material from collecting and building up thereon. A building up of material on the uppermost portion 13 of the screen can in the worst case result in the formation of a plug. The risk thereof is greatest in connection with the start up of the dewatering device. A suitable design of the uppermost portion 13 of the screen is the one shown in FIG. 4. It is chamfered, and possibly deposited material is thereby led away with the filtrate. The uppermost portion 13 of the screen can, for example, also be rounded or sharp.

The decision whether doctor blades or screen means shall be used, depends, for example, on how much liquid is found on the roll after the nip. In the case of large amounts of liquid it is suitable to use a screen means. In the case of a roll with wire cloth a screen means is also to be preferred.

The dewatering device can also, for example, comprise two rolls, of which only one is liquid permeable. The roll which is not liquid permeable can in this case have a considerably smaller diameter than the liquid permeable roll. A gill in this case is provided only for the liquid permeable roll. The same applies to the screen means.

The present invention can also be used on a device intended for washing a material suspension. The material suspension is then treated after the nip in the aforedescribed way, while before the nip it forms, for example, a web on the liquid permeable roll or rolls, to which web washing liquid is applied.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for pressing liquid from a liquid-containing material comprising a pair of juxtaposed rotary rolls forming a nip therebetween, at least one of said pair of juxtaposed rotary rolls being liquid permeable, whereby said liquid-containing material can pass downwardly toward said nip between said pair of juxtaposed rotary rolls for pressing said liquid from said liquid-containing material thereby providing a pressed-out liquid stream and a liquid reduced material, said at least one of said pair of juxtaposed rotary rolls including an abduction surface extending laterally across said at least one of said pair of juxtaposed rotary rolls whereby at least a portion of said pressed out liquid stream runs along said abduction surface, liquid collection means for collecting said portion of said pressed-out liquid stream extending laterally across said at least one of said pair of juxtaposed rotary rolls, said liquid collection means including a liquid inlet for said pressed-out liquid stream, and return flow protection means for preventing said pressed-out liquid stream from re-wetting said reduced liquid material.

2. The apparatus of claim 1 wherein said abduction surface includes an upper end portion including at least one doctor blade for scraping said pressed-out liquid stream from the surface of said at least one rotary roll between said nip and a predetermined location on said roll where said pressed-out liquid stream is released from said roll.

3. The apparatus of claim 1 wherein said abduction surface includes an upper end portion comprising at least one screen member including an upper end adjacent to said roll and displaced a predetermined distance from said roll whereby a film of said pressed-out liquid disposed on said at least one of said pair of juxtaposed rotary rolls below said nip can pass between said upper end of said screen member and said at least one of said pair of juxtaposed rotary rolls before being released from said at least one of said pair of juxtaposed rotary rolls and said reduced liquid material passes on the side of said screen member distal from said at least one of said pair of juxtaposed rotary rolls.

4. The apparatus of claim 3 wherein said predetermined distance is at least about 2 mm.

5. The apparatus of claim 1 wherein both of said pair of juxtaposed rotary rolls are liquid permeable.

6. The apparatus of claim 1 wherein said liquid inlet comprises a gap formed laterally along the entire length of said at least one of said pair of juxtaposed rotary rolls.

7. The apparatus of claim 1 wherein said liquid inlet comprises a plurality of substantially horizontal longitudinally extending rods forming a corresponding plurality of narrow gaps therebetween.

* * * * *